(12) United States Patent
Manire et al.

(10) Patent No.: US 7,703,796 B2
(45) Date of Patent: Apr. 27, 2010

(54) AIR BAG MODULE INCLUDING IMPROVED INFLATOR RETAINER ASSEMBLY

(75) Inventors: Gregory B. Manire, Oxford, MI (US); Kenneth G. Trepiak, St. Clair, MI (US)

(73) Assignee: Key Safety Systems, Inc, Sterling Heights, MI (US)

(*) Notice: Subject to any disclaimer, the term of this patent is extended or adjusted under 35 U.S.C. 154(b) by 405 days.

(21) Appl. No.: 11/332,966

(22) Filed: Jan. 17, 2006

(65) Prior Publication Data

US 2006/0186644 A1  Aug. 24, 2006

Related U.S. Application Data

(60) Provisional application No. 60/654,220, filed on Feb. 18, 2005.

(51) Int. Cl.
*B60R 21/217* (2006.01)
*B60R 21/207* (2006.01)

(52) U.S. Cl. .................... 280/728.2; 280/730.2

(58) Field of Classification Search ............. 280/728.2, 280/730.2, 732, 741; *B60R 21/217*
See application file for complete search history.

(56) References Cited

U.S. PATENT DOCUMENTS

| | | | | |
|---|---|---|---|---|
| 5,135,252 A * | 8/1992 | Suran et al. ................ | 280/732 |
| 5,145,207 A * | 9/1992 | Bederka et al. ............ | 280/732 |
| 5,364,123 A | 11/1994 | Abramczyk et al. | |
| 5,433,471 A | 7/1995 | Shepherd et al. | |
| 5,433,472 A * | 7/1995 | Green et al. ............... | 280/728.2 |
| 5,445,407 A * | 8/1995 | Lotspih ..................... | 280/728.2 |
| 5,487,556 A * | 1/1996 | Jenkins et al. ............. | 280/728.2 |
| 5,577,764 A * | 11/1996 | Webber et al. ............. | 280/728.2 |
| 5,597,176 A * | 1/1997 | Kikuchi .................... | 280/728.2 |
| 5,620,200 A * | 4/1997 | Garner et al. .............. | 280/728.2 |
| 5,639,112 A * | 6/1997 | Phillion et al. ............ | 280/728.2 |
| 5,700,028 A * | 12/1997 | Logan et al. .............. | 280/728.2 |
| 5,906,395 A * | 5/1999 | Isaji et al. ................. | 280/743.1 |
| 6,513,835 B2 | 2/2003 | Thomas | |
| D471,080 S * | 3/2003 | Baumbach .................. | D8/354 |
| 2004/0090049 A1* | 5/2004 | McCann et al. ........... | 280/728.2 |

FOREIGN PATENT DOCUMENTS

| KR | 1998-035145 A | 9/1998 |
|---|---|---|
| KR | 1999-019985 A | 3/1999 |

* cited by examiner

*Primary Examiner*—Ruth Ilan
*Assistant Examiner*—Laura Freedman
(74) *Attorney, Agent, or Firm*—Markell Seitzman

(57) ABSTRACT

An air bag module (20) including: an inflator (200) for providing inflation gas; a bracket assembly (100) having an integral spring portion for resiliently biasing the inflator toward a retained position.

24 Claims, 6 Drawing Sheets

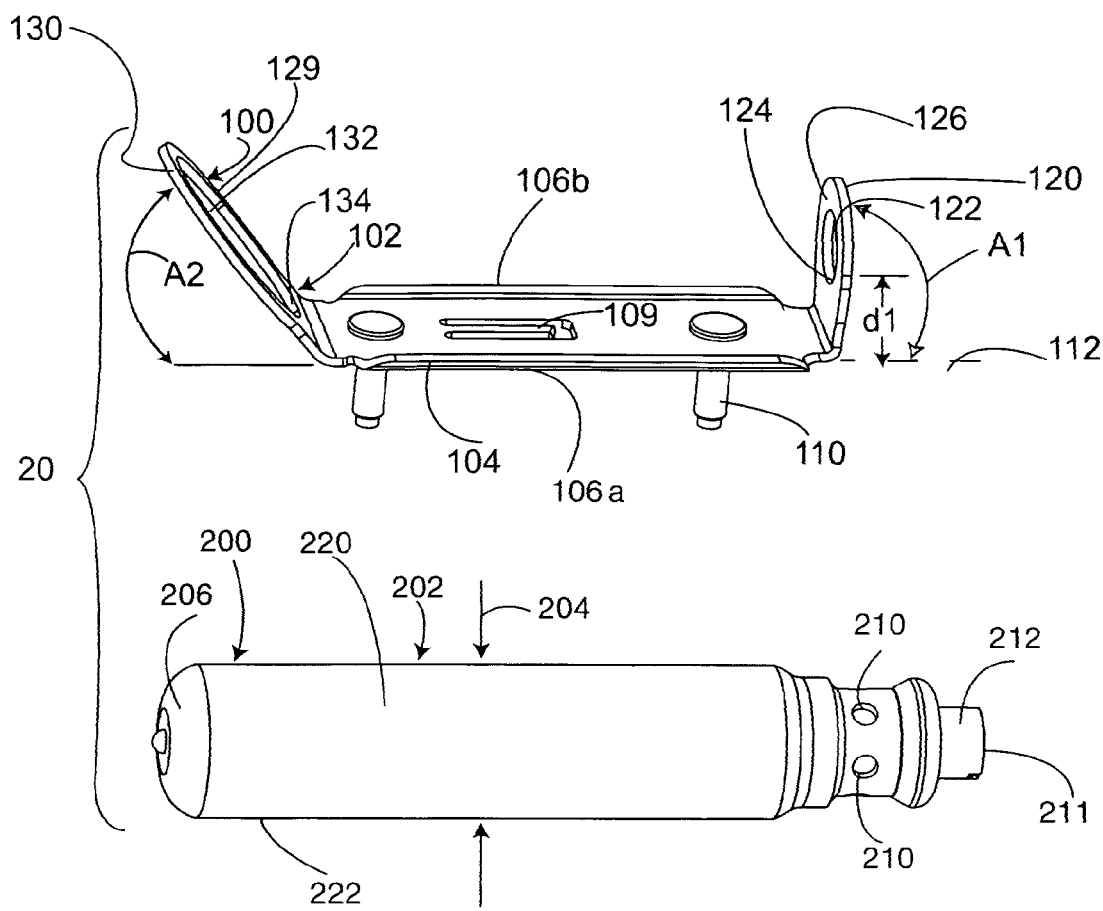
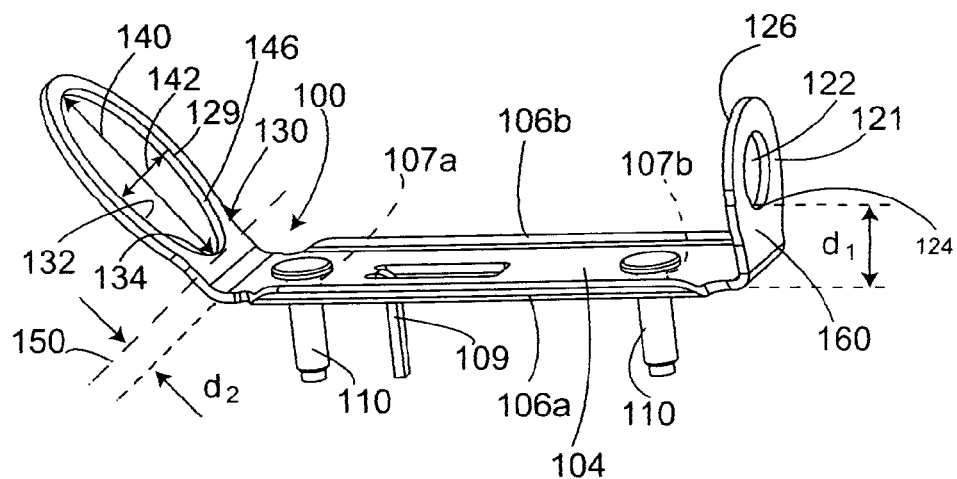
Fig. 1
Fig. 2

AIR BAG MODULE INCLUDING IMPROVED INFLATOR RETAINER ASSEMBLY

This application claims the benefit of U.S. Provisional Application 60/654,220, filed on Feb. 18, 2005. The disclosure of the above application is incorporated herein by reference.

BACKGROUND AND SUMMARY OF THE INVENTION

The present invention relates generally to air bags and more particularly to an improved apparatus and methodology for fabricating and assembling an air bag module.

The illustrated embodiment of the invention identifies a side air bag module; however, the present invention can be implemented with other types of air bag modules, such as curtain, passenger and driver.

It is an object of the present invention to provide an air bag module having fewer parts and an improved bracket with a reactive or spring-like portion.

Accordingly the invention comprises: an air bag module 20 comprising: an inflator 200 for providing inflation gas; a bracket assembly 100 comprising an integral spring portion for resiliently biasing the inflator toward a retained position.

Many other objects and purposes of the invention will be clear from the following detailed description of the drawings.

BRIEF DESCRIPTION OF THE DRAWINGS

FIG. 1 illustrates two of the major components of an air bag module utilizing the present invention.

FIG. 2 is an isometric view of a bracket assembly.

DETAILED DESCRIPTION OF THE DRAWINGS

Figure 2A:
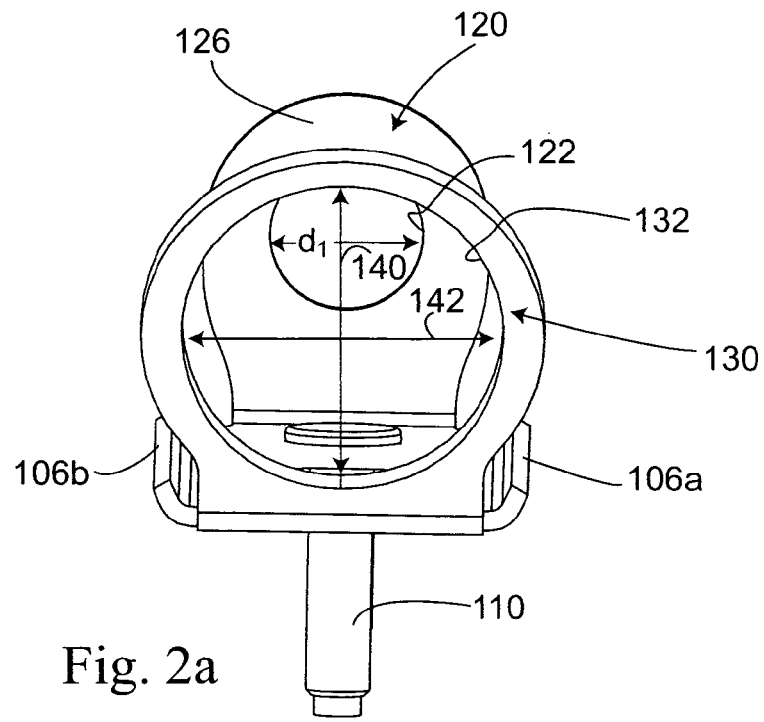
FIG. 2a is an end view of the bracket assembly of FIG. 2.

Reference is made to FIG. 1, which illustrates two of the major components of an air bag module 20 made in accordance with the present invention. The air bag module 20 comprises a retainer or bracket assembly 100, an inflator 200, and an air bag 300 shown in FIG. 6. The air bag 300, once configured in a rolled or folded condition, is maintained in this condition by a thin wrapping 310, also shown in FIG. 6. In certain installations, as known in the art, the air bag module may also include a cover about the thin wrapping for protecting the stored or folded air bag and inflator.

Returning to FIG. 1, the bracket assembly (also referred to as the retainer assembly) comprises a stamped, preferably steel bracket or member 102, having a central, elongated plate portion or plate 104, generally located in the middle of the bracket assembly. The bracket 102 transitions into opposingly situated upraised sides 106a and 106b parallel to a longitudinal axis 112 through the plate portion 104. The sides 106a and 106b are optional as illustrated in the alternate embodiment shown in FIG. 8.

The plate 104 includes a plurality of mounting openings 107a,b shown in FIG. 2. Each opening receives a respective threaded mounting stud 110; each stud is adapted to be secured to a frame portion within the vehicle. The bracket assembly 100 includes two opposed ends 120 and 130, respectively. The plate portion 104, as shown in FIG. 2, includes a stamped feature in the form of a tab 109. The tab is used to identify brackets to be used on left or right-hand vehicle seats or other similar mounting locations. For example, in some brackets the tab 109 is bent down as illustrated in FIG. 2; in other brackets the tab is formed but not bent, or not formed at all.

End 120 is integrally formed as a one-piece component with plate portion 104 and includes a first inflator-receiving opening 122. The lower extreme 124 of the opening is spaced a distance d1 from the top of the plate 102, which is helpful in orienting and positioning the inflator. During fabricating of the bracket assembly, end 120 is bent upwardly (from its initial planar configuration) by an angle A1 degrees (see FIG. 1) from the plane 112 of the plate 104, as illustrated in the figures. Opening 122 is preferably circular in shape, but in general the shape of opening 122 will conform to the shape of a mating part of the inflator or at least permit passage of this mating part therethrough. In the preferred embodiment of the invention the end 120 is bent upwardly by about 85 degrees (A1=85 degrees).

End 130 is also integrally formed as part of the plate 104 with end 120, and comprises an oblong shaped rim 129 having an oblong opening 132. The bottom 134 of opening 132 is spaced a distance d2 from the plate 104 to position and orient the inflator. End 130 is bent upwardly from the plane of plate 104 by an angle of A2. In the preferred embodiment angle A2 is approximately 35 degrees.

As illustrated in FIGS. 2 and 2a, the oblong opening 132 includes a major diameter 140 and a minor diameter 142. Reference is briefly made to FIG. 1 and more particularly to the inflator 200. As can be seen, the inflator is generally cylindrical in shape and includes a major body portion 202, which is circular in diameter. The diameter of the body portion 202 is slightly smaller than the minor diameter 142 to permit passage of the inflator within opening 132.

As illustrated, the inflator 200 is a stored-gas inflator, which includes a gas, air, argon or helium or any combination thereof and a pyrotechnic element or elements, which include at least one initiator 211 that is capable of initiating the release of the stored gas or heating the stored gas prior to exiting a plurality of exit ports 210. The initiator receives an activation signal from an associated controller (not shown). The inflator includes a cylindrically shaped mounting end 212 (which houses the initiator 211 and the initiator's electrical connector 213, see FIG. 8), which is insertable through opening 122 of the bracket assembly 100. In the preferred embodiment, the diameter of end 212 is slightly smaller than the diameter of opening 122.

Figure 3:
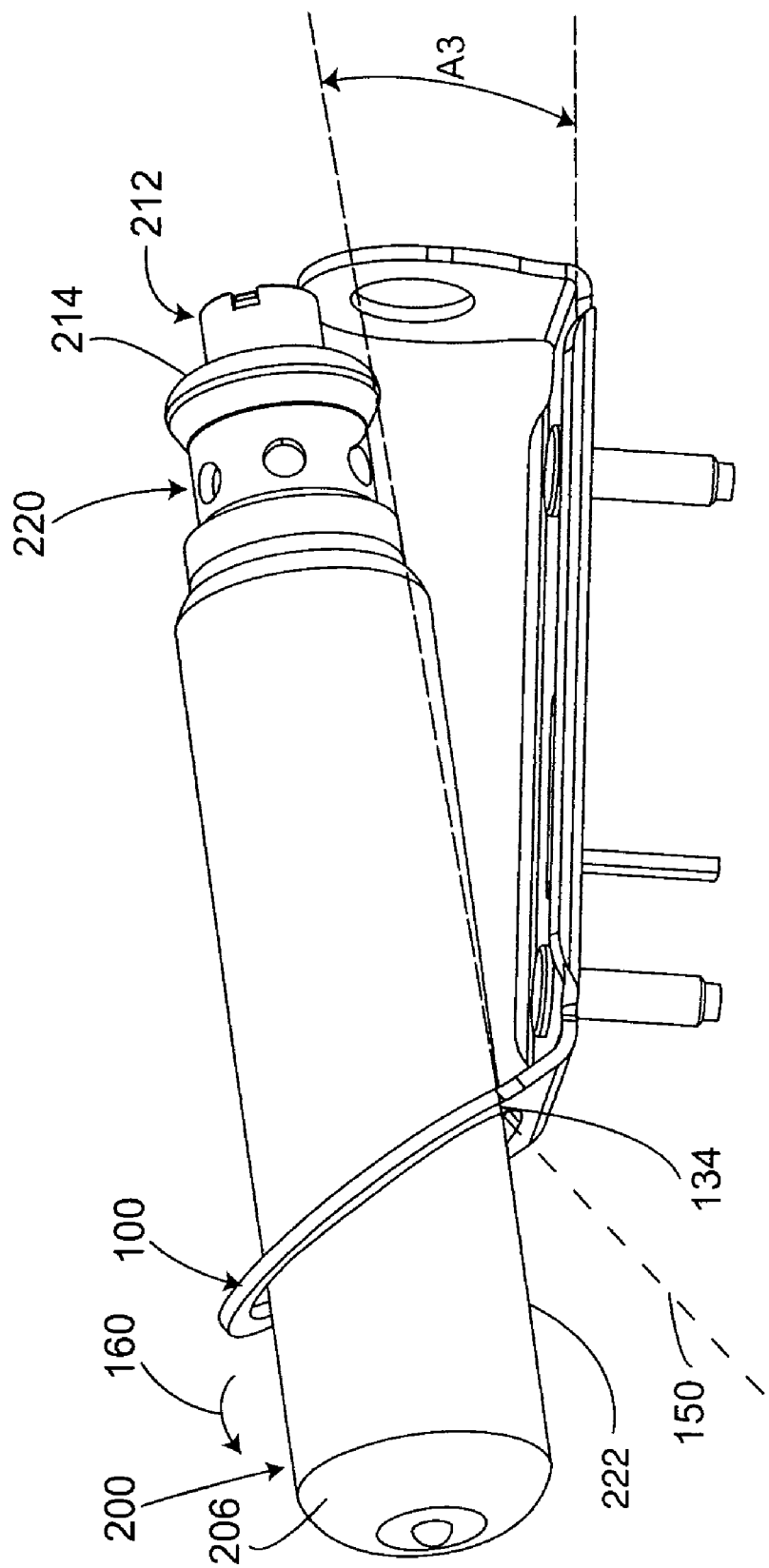
FIG. 3 illustrates the inflator partially received within the bracket assembly.

Reference is now made to FIG. 3, which illustrates the inflator 200 in a partially assembled configuration relative to the retainer assembly 100. In this configuration the large end 206 of the inflator has been inserted within opening 132 of bracket end 130. In this configuration, in view of the fact the minor diameter of opening 130 is generally larger than the outside diameter 206 of the body 202, the inflator is easily inserted within the opening. With the inflator 200 partially inserted within opening 132, the lower side or bottom 222 of the inflator 200 engages the lower extremes 146 or bottom 134 of opening 132, which provides an effective pivot point about which the inflator will rotate. As the inflator 200 is positioned in opening 132, the plate 104 of the bracket is maintained in a generally horizontal orientation.

The inflator 200 will seek a stable angular orientation, as it will rotate about the pivot point until the upper side or top 220 of the inflator engages the top or apex 144 of opening 132, at which time the inflator 200 will be oriented at an angle A3 relative to the plate 104. Thereafter the end 212 of the inflator 200 is pushed into contact with the inner side or face 126 of bracket end 120, as shown in FIG. 3. Angle A3 is proportional to the relative size of the major diameter 144 and the diameter of the inflator. For example, the angle A3 will decrease with increasing major diameters. As can be seen in FIG. 3, in the above-described configuration, end 212 of the inflator 200 is positioned adjacent the inner side 126 of end 120. In the intermediary configuration the geometric center of the circular end 212 is slightly above the geometric center of circular opening 122.

With the inflator and bracket in the condition as described in FIG. 3, the inflator 200 is rotated downwardly relative to the plate 104 of the bracket assembly while the inflator remains in the opening 132. As the inflator is rotated, it remains in contact with the bracket 100 at the top or apex 144 of opening 132, as well as at the bottom or nadir 134 of opening 132. The sharp edges of the bracket 100 about the opening 132 hold the inflator 200 in place.

Figure 4:
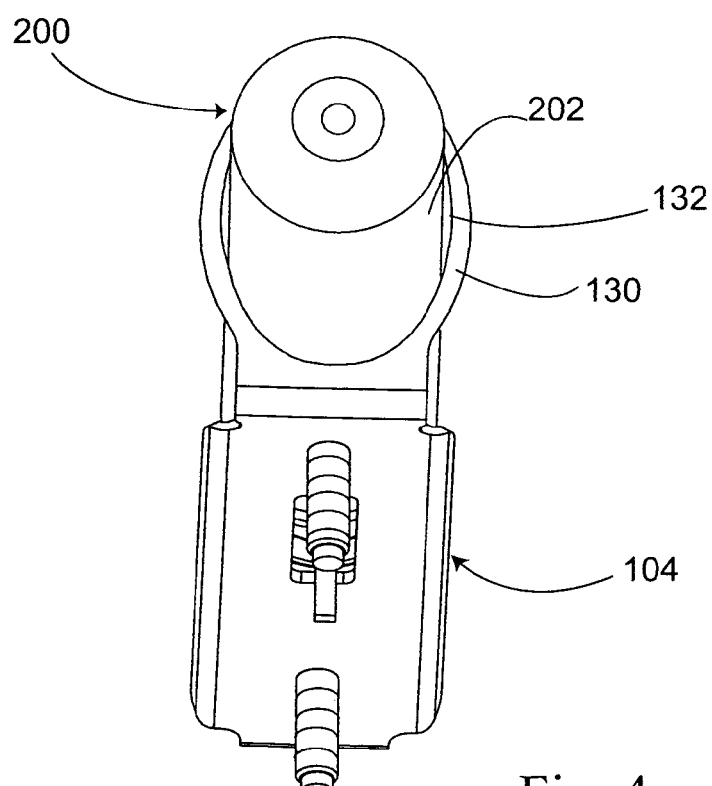
FIG. 4 is an isometric, end view illustrating the condition of the inflator corresponding with that of FIG. 3.

Reference is briefly made to FIG. 4, which is an end-isometric view of the partially assembled inflator/retainer assembly of FIG. 3. The relationship between the size of the body 202 and opening 132 can be seen more clearly in this FIG. 4.

Figure 5:
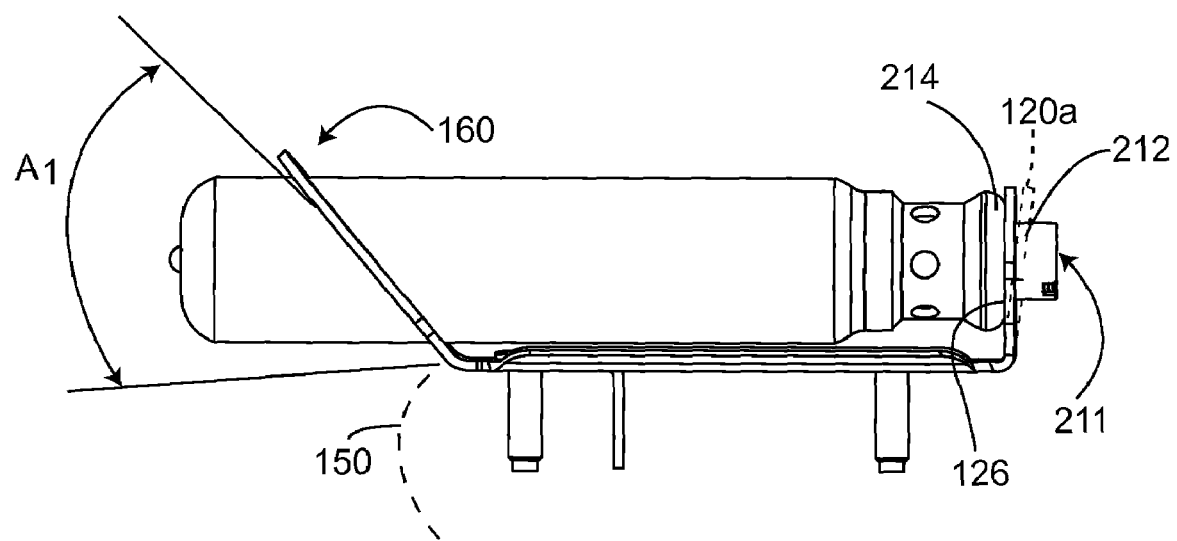
FIG. 5 is an isometric view showing the inflator fully assembled to the bracket assembly.

To complete the assembly of the inflator 200 to the retainer assembly or bracket 100, the inflator 200 is forcibly rotated downwardly as illustrated by arrow 220, of FIG. 3, positioning end 212 in alignment with opening 122. As the inflator rotates, the inflator will bend or rotate bracket end 130 about an axis 150. As the bracket end 130 rotates, it retains its elastic characteristics and acts as a spring, generating upon the inflator a bias, or twisting force in the direction of arrow 160 (see FIGS. 3 and 4) opposite to the direction of rotation. As can also be appreciated, end 130 is configured as an integral spring steel portion of the bracket assembly. Additionally, as the inflator is rotated, end 212 of the inflator 220 slides upon face 126 of the bracket end 120, pushing this bracket end outwardly (the opposite end of the inflator being retained in opening 132), see numeral 120a FIG. 5. When the inflator end 212 is in alignment with the opening 122, the inflator end 212 snaps into opening 122 of the bracket end 120, which returns to its initial orientation. Thereafter the inflator is forcibly moved to the right as illustrated in FIG. 3 so end 212 moves through opening 122 until the enlarged portion 214 of the inflator becomes butted against the inner side or face 126 of bracket end 120.

Figure 8:
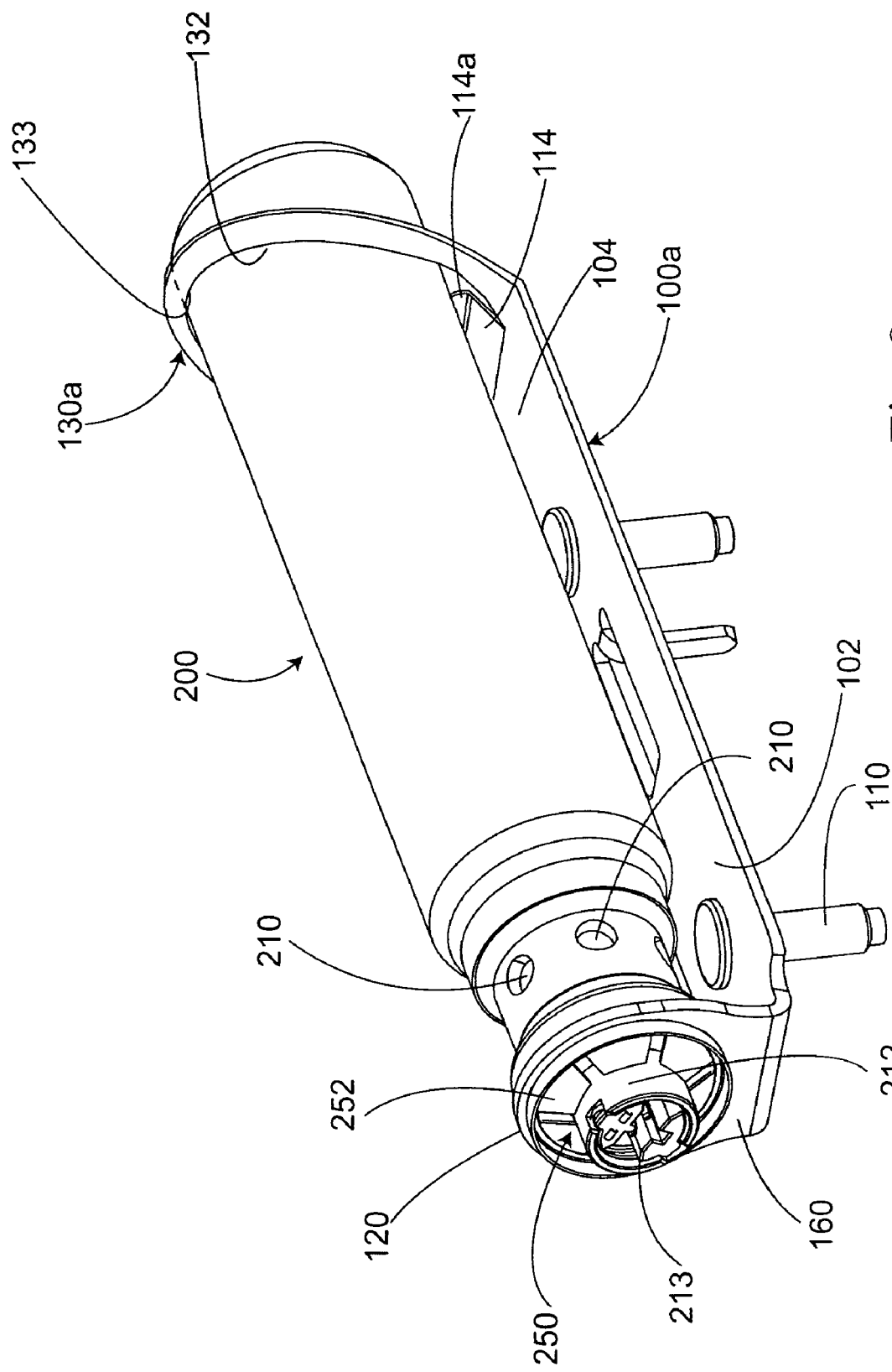
FIG. 8 illustrates an alternate embodiment of the invention.

Additionally, the spring force created by the bending of bracket end 130 is sufficient to prevent the inflator from moving in and out relative to the bracket in an axial direction. However, if desired, an additional snap ring or retainer can be inserted upon the extending end portion of end 212 and pushed inwardly until it engages the outer side 160 of bracket end 120. Such a spring retainer 250 is shown in FIG. 8. The spring retainer has a plurality of spring fingers 252 fitted to the extending portion of end 212.

Figure 6:
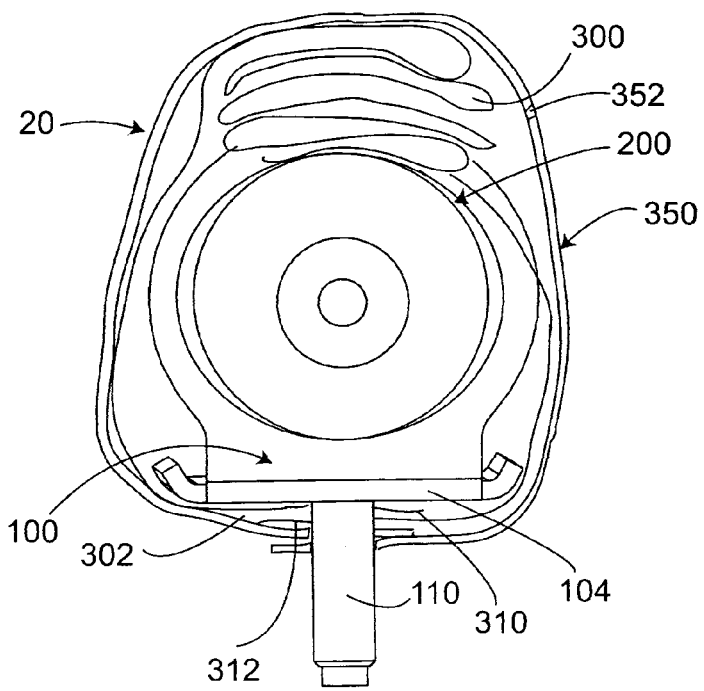
FIG. 6 is a cross-sectional view of a side impact air bag module constructed in accordance with the invention.

Reference is briefly made to FIG. 6, which is a cross-sectional view showing a portion of the retainer or bracket assembly 100 and inflator 200 with one of the mounting fasteners 110 extending through the plate portion 104 of the bracket assembly. FIG. 6 also illustrates the assembled module 20. The module, as mentioned above, additionally includes an air bag 300. In the illustrated embodiment the air bag, which is of conventional construction, includes an opening or neck portion 302 into which the inflator-bracket sub-assembly has been inserted. Thereafter, the opposing flaps 310 and 312 of the air bag 300 are positioned upon the mounting studs 110 with each mounting stud 110 entering and passing through a respective opening in each of the flaps 310 and 312. Thereafter, the air bag is configured into a compact pre-inflation configuration, such as being rolled or folded or a combination thereof. This compact configuration is maintained in a known manner by enveloping the folded air bag with a breakable, protective covering 350. The covering is typically manufactured of a Tyvek or a paper-like material having a plurality of perforations 352, which are ruptured upon inflation of the air bag. In certain installations, the covering 350 can be enveloped by a breakable thicker plastic cover (not shown).

Figure 7:
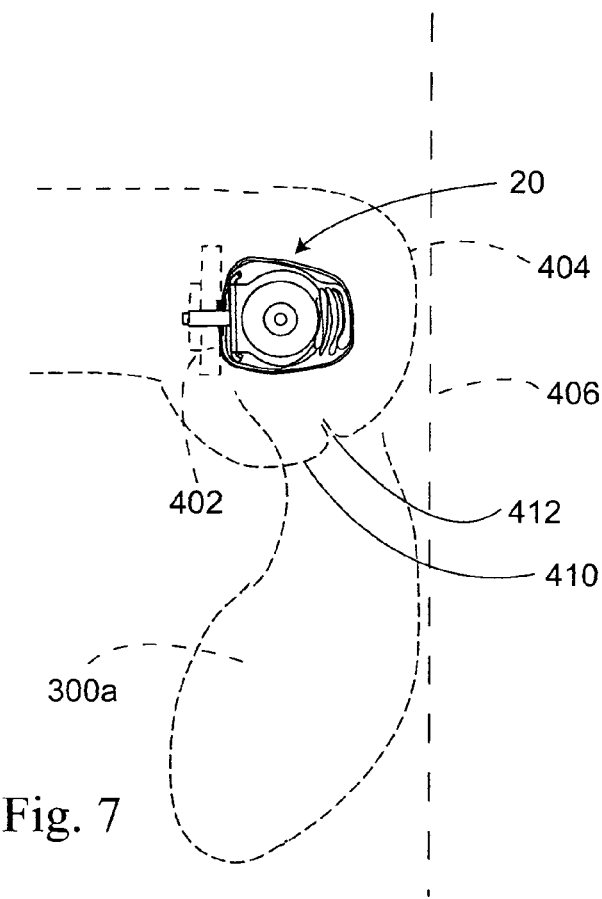
FIG. 7 illustrates the air bag module of FIG. 6 installed in a vehicle seat and configured as a side impact air bag module.

Reference is briefly made to FIG. 7, which illustrates the module 20 installed on a section of a frame 402 of a portion of the vehicle. In the preferred embodiment, this frame 402 is an outside frame section of a vehicle seat 404. The outside frame section is adjacent, for example, a vehicle door 406. The air bag module 20 is further encapsulated within the seat upholstery 410, which is often of a multi-layered construction. The upholstery typically will include a weakened point, region or area generally designated as 412, which is ruptured as the air bag inflates, thereby providing a channel or guide for the inflating air bag, the inflated air bag being shown by phantom line 300a. In operation, once associated sensors of the vehicle sense an actual or impending collision, an activation signal is sent to the igniter 211 of the inflator 200, which provides the supply or the generation of inflation gas, which is communicated to the air bag through inflator ports 210. The air bag is subsequently inflated, rupturing the protective enveloping covering 350 as well as the seat cushion upholstery 410.

FIG. 8 shows an alternate embodiment of the invention. The bracket 100a has a flat plate portion 104 (without upraised edges) and an end 120 to receive end 212 of the inflator and to support snap ring 250. The bracket 100a includes an opposite bracket end 130a having an inflator receiving opening 132. Bracket end 130a is formed as an integral part of the bracket 100a and is bent upwardly from the plate 104 to a fixed position and orientation. Opening 132 is larger than the diameter of the inflator as in the case with the earlier embodiment. In this embodiment end 130a serves to hold the inflator 200 in place but does not provide a spring function. The spring function is provided by a spring formed as an extending part, lever or spring tab 114 portion of plate 104. Initially, end 114a of tab 114 is configured to be above the plane of the plate 104 to interfere with the inflator as the inflator 200 is inserted within opening 132. The spring or spring tab 114 urges the inflator 200 against the top region 133 of opening 132.

Many changes and modifications in the above-described embodiment of the invention can, of course, be carried out without departing from the scope thereof. Accordingly, that scope is intended to be limited only by the scope of the appended claims.

The invention claimed is:

1. An air bag module (20) comprising:
an inflator (200) for providing inflation gas;
a retainer or bracket assembly (100)
having a central plate portion, a flexible first bracket end (120) oriented at a non-perpendicular angle relative to a plane of the central plate portion and a flexible, second bracket end (130) oriented at an initial first non-perpendicular predetermined angle relative to the plane of the central plate portion, and a portion of the second bracket end configured as a spring and being deformable by movement of the inflator into a retained position of the inflator, the inflator when in an installed position extending across and through the first and second bracket ends, with portions of the inflator located on opposing sides of each of the first and second bracket ends; and the second bracket end configured to create a twisting force upon that portion of the inflator extending through the second bracket end as a result of the second bracket end being deformed.

2. The module according to claim 1 wherein the first bracket end (120) includes a first opening and wherein the second bracket end (130) includes a second opening and wherein that portion of the inflator insertable into the second opening is smaller than the second opening.

3. The module according to claim 2 wherein the second bracket end is configured to engage the inflator near a top and a bottom of the second opening as the inflator is moved to the retained position and to be bent as the inflator is so positioned.

4. A method of assembling an air bag module according to claim 1 comprising the steps of:
 a) inserting the inflator through the second bracket end of the bracket assembly;
 b) rotating the inflator to a preferred position relative to the bracket assembly and while rotating the inflator, bending the second bracket end of the bracket assembly creating the twisting force on the inflator.

5. The method of claim 4 including the step of inserting the inflator into the first bracket end of the bracket assembly.

6. An air bag module (20) comprising:
 a cylindrically shaped inflator (200) for providing inflation gas to an air bag (300);
 a bracket assembly (100) for receiving, holding and orienting the inflator comprising a first retaining bracket (120) having opposing sides and a first opening (122) configured to receive a complementary shaped portion of the inflator and an opposing second retaining bracket (130), the second retaining bracket having opposing sides, and the inflator configured to extend completely through both the first and the second retaining brackets with portions of the inflator positioned adjacent each opposing side of the first and second retaining brackets; and the second retaining bracket bent by the operation of the inflator, the second retaining bracket further configured to provide a twisting force upon the inflator in reaction to being bent, urging the inflator into portions of the first retaining bracket about the first opening, the second retaining bracket being the only retaining bracket providing a twisting force.

7. The module according to claim 6 wherein the bracket assembly includes a center portion between the first and second retaining brackets, and wherein the second retaining bracket is initially oriented at a predetermined angle relative to the center portion and bent inwardly toward the center portion by operation of the inflator.

8. The module according to claim 7 wherein the first retaining bracket is configured to bend outwardly from an initial configuration upon receipt of the inflator and upon receipt of the inflator in the first opening to return to the initial configuration.

9. The module according to claim 7 wherein the second retaining bracket extends away from the center portion at an angle of about 85 degrees.

10. The module according to claim 7 wherein the first retaining bracket extends away from the center portion at an angle of about 95 degrees.

11. The module according to claim 6 wherein the second retaining bracket is configured to apply a twisting load to the inflator.

12. An air bag module comprising:
 a retainer or bracket assembly comprising a center portion and a first retainer end portion and a second retainer end portion,
 each of the first and second retainer end portions disposed generally at opposing ends of the center portion and in general alignment with one another,
 the first retainer end portion includes a first opening and the second retainer end portion includes a second opening, each of the first and second openings configured to receive and retain a respective first inflator end and an elongated body portion of an air bag inflator, the inflator crossing both the first and the second retainer end portions, the second retainer end portion further configured to be bent by the inflator as the inflator is twisted into a mounted position and the second retainer end portion generating a twisting bias retaining force on the inflator, the force directed opposite to the direction the second retainer end portion is bent, the force urging the first inflator end into a portion of the first retainer end portion.

13. The module according to claim 12 wherein the second retainer end portion, prior to being bent, is generally planar in shape and extends away from the center portion of the bracket assembly along a predetermined obtuse angle.

14. The module according to claim 13 wherein the inflator includes the elongated body portion having a cylindrical shape receivable into and through the second retainer end portion.

15. The module according to claim 14 wherein the second opening is oblong in shape and includes a first diameter generally perpendicular to a second diameter, the first diameter being longer than the second diameter.

16. The module according to claim 12 wherein the second opening of the second retainer end portion is configured to permit the inflator to be moved through the second opening and wherein the second retainer end portion is configured to act as a pivot to enable the inflator to move about the pivot and rotate within the second opening.

17. The module according to claim 12 including a fastener secured to the first inflator end, located proximate an exterior surface of the first retainer end portion.

18. The module according to claim 12 wherein the first retainer end portion is substantially perpendicular to the center portion.

19. The module according to claim 18 wherein the first retainer end portion is oriented at an angle of about 95 degrees relative to the center portion.

20. The module according to claim 12 wherein the second retainer end portion is configured to engage the inflator near a top and a bottom of the second opening as the inflator is moved to a retained position and to be bent as the inflator is so positioned.

21. An air bag module (20) comprising:
 an inflator (200) for providing inflation gas; the inflator having a first end, a second end and a body between the first and second ends;
 a retainer or bracket assembly (100)
  having a central plate portion, a flexible first bracket (120) having a first opening therein, a second bracket (130) oriented at an initial first non-perpendicular predetermined angle relative to the central plate portion, the second bracket having a second opening therein;

when the inflator is in a mounted configuration upon the retainer or bracket assembly, the first end extends outward from the first bracket, the second end extends away from the second bracket and wherein the body is in direct contact with the second bracket, wherein the second bracket is configured as a spring and deformable by movement of the inflator body to the mounted configuration and the second bracket configured to create a twisting force upon the body of the inflator tending to hold the body in the retainer or bracket assembly.

22. The air bag module according to claim 21 wherein a portion of the second bracket, proximate a lower portion of the second opening, is configured as a hinge about which the inflator can rotate as the inflator is moved to the mounted configuration upon the bracket assembly.

23. The air bag module according to claim 22 wherein when the inflator is in a mounted configuration within the bracket assembly, a portion of the inflator body apart from that portion proximate the hinge is in contact with an upper portion of the second bracket, wherein the upper portion of the flexible bracket generates at least a portion of the twisting force acting on the body.

24. The air bag module according to claim 21 wherein the body has a length and the bracket assembly has a length, wherein the length of the body of the inflator is not restricted to be substantially the same value as the length of the bracket assembly.

* * * * *